No. 829,112. PATENTED AUG. 21, 1906.
F. K. LATHROP.
CORN AND COTTON PLANTER.
APPLICATION FILED NOV. 28, 1904.

2 SHEETS—SHEET 1.

Witnesses
C. M. Fahnestock
O. S. Kyle

Inventor
Frank K. Lathrop
by Alfred M. Allen
Attorney

No. 829,112. PATENTED AUG. 21, 1906.
F. K. LATHROP.
CORN AND COTTON PLANTER.
APPLICATION FILED NOV. 28, 1904.

2 SHEETS—SHEET 2.

Witnesses
C. M. Fahnestock
H. S. Tyle

Inventor
Frank K. Lathrop
by Alfred M. Allen
Attorney

UNITED STATES PATENT OFFICE.

FRANK K. LATHROP, OF DAYTON, OHIO, ASSIGNOR TO THE OHIO RAKE COMPANY, OF DAYTON, OHIO, A CORPORATION OF OHIO.

CORN AND COTTON PLANTER.

No. 829,112.        Specification of Letters Patent.        Patented Aug. 21, 1906.

Application filed November 28, 1904. Serial No. 234,580.

*To all whom it may concern:*

Be it known that I, FRANK K. LATHROP, a citizen of the United States, residing in Dayton, in the county of Montgomery and State of Ohio, have invented certain new and useful Improvements in Corn and Cotton Planters, of which the following is a full, clear, and exact description, reference being had to the accompanying drawings, forming part of this specification.

My invention relates to the feed mechanism for delivering the seed to be planted to the furrow; and it consists of that certain novel combination of parts, to be hereinafter pointed out and claimed, whereby economy of construction and simplicity of arrangement are obtained, and whereby the machine may be easily and rapidly changed from a cotton to a corn planter, or vice versa, by the mere substitution of one covering-plate for another, and in which both the cotton and corn may be fed to the delivery-tube in full sight of the operator without effecting any change in the mechanism.

Figure 4:
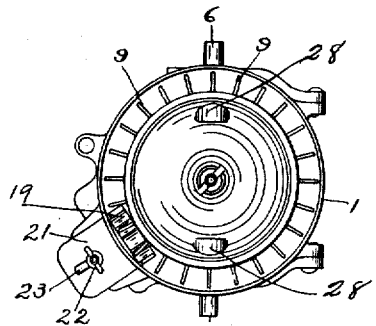
Figure 3:
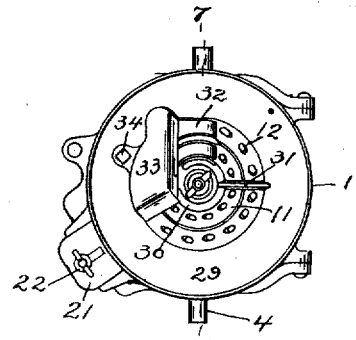
Figure 2:
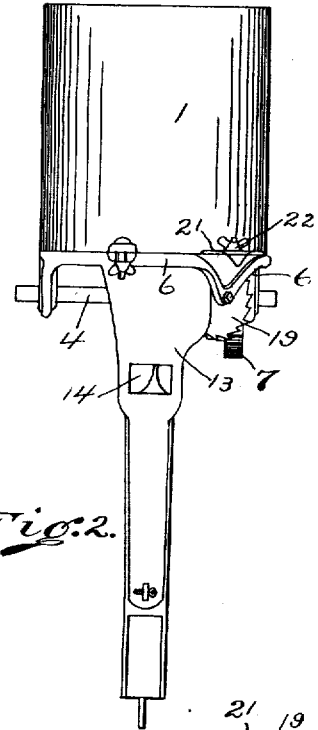
Figure 1:
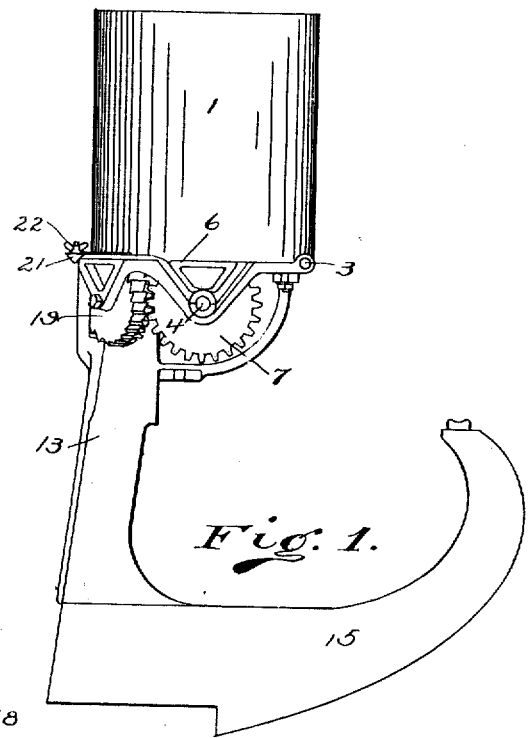
Figure 5:
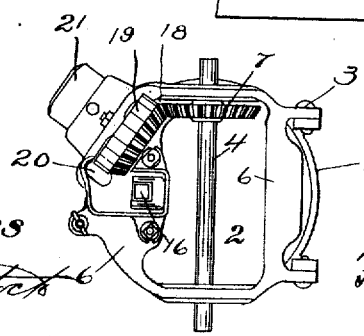
Figure 6:
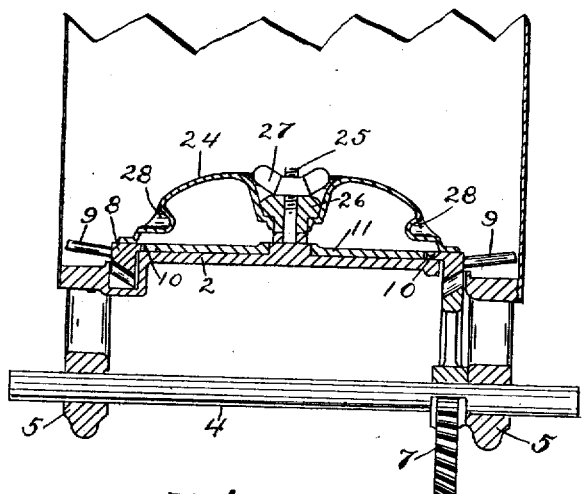
Figure 7:
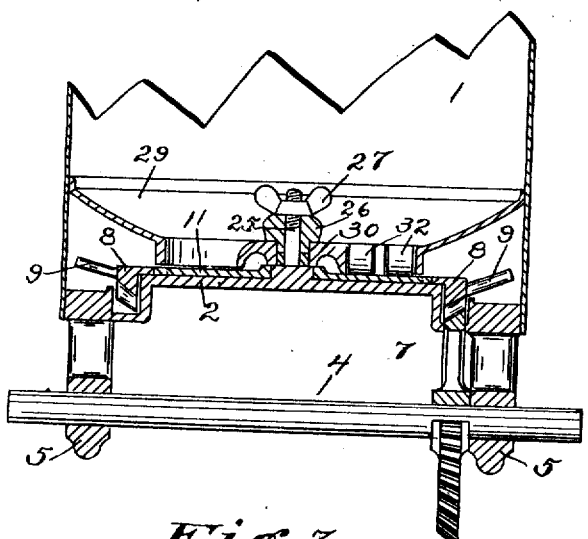

In the drawings, Figure 1 is a side elevation of the seed-hopper conducting-tube and runner or furrow-opener of the planter. Fig. 2 is a rear elevation of same. Fig. 3 is a plan view of the seeding devices for the corn. Fig. 4 is a similar plan view for the cotton-seed. Fig. 5 is a bottom plan of the operating devices. Fig. 6 is a central vertical section taken on the lines 6 6 of Fig. 4, and Fig. 7 is similar vertical section taken on the lines 7 7 of Fig. 3.

I have only illustrated in the drawings the seeding mechanism, as my invention is particularly directed to this portion of the planter, and any construction of frame and operating mechanism can be used therewith.

1 is the seed-hopper, of the usual cylindrical shape, mounted on and secured to the bottom plate 2, the bottom plate being hinged at 3 to the framework-casting 6, so that the hopper when desired can be thrown back to obtain access to the driving-gearing.

4 is the driving-shaft for the seed mechanism, driven in any suitable way in the operation of the planter and supported in suitable journal-bearings 5 5 in the frame-casting 6 underneath the seed-hopper.

7 is the driving-gear, mounted on the driving-shaft 4 and engaging the usual gear-ring 8, which rests upon the bottom plate 2 of the hopper. This gear-ring is provided with a series of radial fingers 9 9, which extend nearly to the wall of the hopper, and the gear-ring is provided with the usual slots (not shown) on its inner edge to receive the lugs 10 10 of the seed-plate 11, so that the gear-ring and seed-plate will rotate together. This seed-plate is provided with the seed-openings 12 to carry the corn to the opening 16 in the bottom plate of the hopper, whence it drops down into the conducting-tube 13 in front of the window 14 and whence it is delivered into the furrow at the heel of the runner or furrow-opener 15.

The gear-wheel 7 on the driving-shaft in addition to meshing with the gear-ring also meshes with the gear 18 on the wide-faced ratchet feed-wheel 19. This gear and feed wheel 19 is journaled on a spindle at an angle to the axis of the driving-shaft 4, with the periphery of the ratcheted feed-wheel extending through an opening 20 in the bottom of the hopper under the radial fingers 9. It will be seen from this location of the feed-wheel 19, which is intended to feed the cotton-seed when the machine is used for a cotton-planter, that its ratcheted periphery permits the carrying of the seed down through the opening 20 in the bottom plate of the hopper into the same conducting-tube 13 into which the corn is fed when the machine is used as a corn-planter. It will also be evident that the rotation of this feed-wheel 19 will be opposed to the rotation of the radial fingers 9 on the gear-ring, and the effect will be to effectually separate and tear apart the cotton-seed and to feed it evenly and continuously into the conducting-tube.

21 is a cut-off plate adjustable by a thumb-nut bolt 22 in the slot 23 in the plate to increase or diminish the exposed surface of the cotton-feed ratchet-wheel and the size of the discharge-opening.

When the planter is to be used for the planting of cotton, a spherical cover 24 is employed to cover up the corn-feeding mechanism. 25 is a screw-threaded pin mounted on the bottom plate, and the cotton-covering plate 24 is secured in place by the nut or washer 26, arranged to fit down in the central depression in the cover-plate on the pin 25, and the cover is clamped to the bottom plate by the thumb-nut 27. When this cover 24 is in place, it will be evident that the cornseed plate and feeding mechanism will be entirely covered up and that the spherical shape of the cover will tend to deliver the cotton-seed toward the perimeter of the bottom plate and into contact with the radial fingers 9, which, with the rotation of the gear-ring 8, will carry the cotton-seed to the ratcheted periphery of the feed-wheel 19, which, rotating in the opposite direction, will tear apart the seed and force it down through the opening 20 in the bottom plate into the conducting-tube to the furrow. Finger depressions 28 are provided in the spherical cover 24 to permit its ready removal when it is desired to convert the machine into a cornplanter.

To make this change, the cotton-cover plate 24 is removed and the corn-cover plate 29 is substituted therefor. This cover-plate consists of a concave disk plate, with a central opening to permit the corn to fall upon the seed-plate 11. The disk plate is provided with a central hub portion 30, with an opening therein to allow for the passage of the pin 25, the central portion being connected with the main body of the plate by the bridge-piece 31. This cover-plate carries the usual spring-press fingers 32, which bear on top of the seed-plate to clear the plate of all kernels of corn except those in the seed-plate openings 12, and it also carries the usual spring-press knockers (not shown) at the rear of the fingers 32 to force the grain down into the opening 16 in the bottom plate of the hopper. These fingers and knockers are mounted on or within the plate 33, which is bolted at 34 to the cover-plate. This plate is secured in place in the same way that the cotton-seed plate 24 is secured by the nut-washer 26 and the thumb-nut 27 on the pin 25.

It will be evident from the foregoing description that the planter may be converted from a corn to a cotton planting device with the greatest ease and rapidity. None of the seeding parts are removed in making the change. The parts are so constructed and arranged that by merely changing the covers the transformation may be accomplished.

Having thus described my invention, what I claim as new, and desire to secure by Letters Patent, is—

1. In a planter, the combination with the seed-hopper, of a gear-ring carrying radial fingers for one kind and a seed-plate for another kind of seed, with means for rotating said gear-ring to operate both devices, and covers for covering either said radial fingers or the seed-plate, to change the character of the planter without removal of any of the seeding parts.

2. In a planter, the combination with the seed-hopper, of a ring carrying radial fingers, mounted to rotate in the bottom of said hopper, a gear for actuating said ring and a feed-wheel to force the seed from the hopper, said feed-wheel being mounted at an oblique angle to the actuating-gear, with connection therefor with said gear, whereby said radial fingers and feed-wheel are driven simultaneously in opposing directions.

3. In a planter, the combination with the seed-hopper, of a ring carrying radial fingers, mounted to rotate in the bottom of said hopper, a gear for actuating said ring and a feed-wheel with a wide-faced ratcheted periphery to force the seed from the hopper, said feed-wheel being mounted at an oblique angle to the actuating-gear, with connection therefor with said gear whereby said radial fingers and feed-wheel are driven simultaneously in opposing directions.

4. In a planter, the combination with the seed-hopper, of a gear-ring carrying radial fingers for the feeding of cotton and also carrying a seed-plate for feeding corn, with gearing for operating both devices, a semispherical cover to cover the seed-plate, and a disk plate to cover the radial fingers, with means for securing either of said covers to the bottom of the hopper to vary the character of feed.

5. In a planter, the combination with the seed-hopper, of a ring carrying radial fingers mounted to rotate in the bottom of the hopper, seed-plate mounted within said ring, gearing for rotating said ring, a feed-wheel, coöperating with said fingers, mounted at an oblique angle to the actuating-gear, with feed-openings for the delivery of the seed therethrough in close proximity to each other and a common conducting-tube for the seed to the furrow.

6. In a planter, the combination with the seed-hopper, of a ring carrying radial fingers mounted to rotate in the bottom of the hopper, seed-plate mounted within said ring, gearing for rotating said ring, a feed-wheel, with a wide-faced ratcheted periphery coöperating with said fingers, mounted at an oblique angle to the actuating-gear, with feed-openings for the delivery of the seed therethrough in close proximity to each other, and a common conducting-tube for the seed to the furrow.

7. In a planter, the combination with the seed-hopper, of a seed-plate mounted to rotate in the bottom thereof, an opening in the bottom of the hopper for the seed delivered by said seed-plate, gearing for actuating said seed-plate, said seed-plate carrying a ring provided with radial fingers and a feed-wheel coöperating therewith mounted obliquely to said gearing and an opening in the hopper for the seed delivered by said feed-wheel, with a conducting tube common to both of said seed-openings.

8. In a planter, the combination with the seed-hopper, of a seed-plate mounted to rotate in the bottom thereof, an opening in the bottom of the hopper for the seed delivered by said seed-plate, gearing for actuating said seed-plate, said seed-plate carrying a ring provided with radial fingers and a feed-wheel coöperating therewith having a wide-faced ratcheted periphery mounted obliquely to said gearing and a contractible opening in the hopper for the seed delivered by the ratcheted periphery of said feed-wheel, with a conducting-tube common to both of said seed-openings.

9. In a planter a feeding-plate having internal and external annular series of feeding devices, in combination with interchangeable means for covering at will either the inner or outer series.

FRANK K. LATHROP.

Witnesses:
R. W. ALEXANDER,
EMMA L. TRESSLER.